United States Patent
Jung

[19]

[11] Patent Number: 6,110,250
[45] Date of Patent: Aug. 29, 2000

[54] PARTICLE FILTER IN THE FORM OF A PLEATED NON-WOVEN LAYER

[75] Inventor: Reinhard Jung, Kemnath, Germany

[73] Assignee: Irema-Filter GmbH, Postbauer-Pavelsbach, Germany

[21] Appl. No.: 09/202,996

[22] PCT Filed: Jul. 10, 1997

[86] PCT No.: PCT/EP97/03657

§ 371 Date: Feb. 25, 1999

§ 102(e) Date: Feb. 25, 1999

[87] PCT Pub. No.: WO98/02228

PCT Pub. Date: Jan. 22, 1998

[30] Foreign Application Priority Data

Jul. 12, 1996 [DE] Germany ............................ 196 28 184

[51] Int. Cl.$^7$ ............................................. B01D 39/08
[52] U.S. Cl. .................... 55/522; 55/524; 55/527; 55/528; 55/385.3
[58] Field of Search ............................. 55/497, 521, 522, 55/524, 527, 528, DIG. 42, DIG. 43, DIG. 44, DIG. 45, 385.3, DIG. 5; 428/157, 327

[56] References Cited

U.S. PATENT DOCUMENTS

| | | | |
|---|---|---|---|
| 4,011,067 | 3/1977 | Carey, Jr. | 55/528 |
| 4,041,203 | 8/1977 | Brock et al. | 428/157 |
| 4,116,648 | 9/1978 | Busch | 55/527 |
| 4,164,400 | 8/1979 | Wald | 55/528 |
| 4,257,791 | 3/1981 | Wald | 55/528 |
| 4,478,620 | 10/1984 | Tamura | 55/524 |
| 4,589,894 | 5/1986 | Gin et al. | 55/528 |
| 4,650,506 | 3/1987 | Barris et al. | 55/528 |
| 4,761,311 | 8/1988 | Stone et al. | 428/327 |
| 5,501,794 | 3/1996 | Van de Graaf et al. | 55/497 |

*Primary Examiner*—David A. Simmons
*Assistant Examiner*—Minh-Chau T. Pham
*Attorney, Agent, or Firm*—Browdy and Neimark, P.L.L.C.

[57] ABSTRACT

The invention relates to a filter arrangement including a pleated nonwoven layer for use as a motor vehicle interior filter. The nonwoven layer is in the form of a single-layer, self-supporting micro-spunbonded fabric, the weight per unit area thereof being between 70 g/m$^2$ and 200 g/m$^2$, preferably between 110 g/m$^2$ and 150 g/m$^2$, the thickness thereof being between 0.7 and 1.5 mm, and the fibre thickness being between 2 and 20 $\mu$m with an average fibre thickness of 3 to 5 $\mu$m.

16 Claims, 1 Drawing Sheet

PARTICLE FILTER IN THE FORM OF A PLEATED NON-WOVEN LAYER

FIELD AND BACKGROUND OF THE INVENTION

The invention relates to a particle filter in the form of a pleated non-woven layer. Filters of the generic type are used for instance as ambient air filters, and in particular as motor vehicle interior filters. During the manufacture of filters of the generic type, a material disposed in layers is pleated, i.e. it is arranged in concertina-type pleats, the distance of these pleats from each other being customarily fixed by a marginal strip glued on or by clamping in a frame. A filter of this design is then itself inserted for replacement in a filter frame.

Conventionally, various designs are available for the filtration of motor vehicle interior air:

On the one hand non-woven staple fibers are known, the pleatability of which is attained by a meshed support sheet for example of polypropylene. On the other hand there are so-called meltblowns which are placed on spunbonded fabrics or paper carriers and are united with same by ultrasonic spots or hot-melt adhesive spots.

The only type of filter which, in this field, does without any supporting layer is the so-called grit mat which is however flat and non-pleated or non-pleatable when inserted into the filter receptacle.

All the filter materials that have to be pleated have in common that they must exhibit a certain rigidity of their own in order for them to maintain their pleated design when employed in practice, which is why conventionally these non-wovens are laminated, i.e. they are combined with support layers.

The meltblowns and non-woven staple fibers mentioned either have too little substance or they are too soft to ensure by themselves proper and durable pleating.

Using support layers results in that, in as much as the cost effectiveness ratio is concerned, the costs of a spunbonded fabric for meltblown support can amount to as much as 70% of the total cost of the composite. The costs of a meshed sheet for the support of non-woven staple fibers amount to as much as 20%, the total cost being considerably higher than in the case of the design mentioned above.

The support components are of use exclusively in the sense of mechanical stabilization, whereas they are substantially useless from the point of view of filtering technology. Spunbonded fabrics only can retain particles in the range of >5 $\mu$m, which is why they are designated as prefilters. However, particles of this size deposit before reaching the heating or conditioning chamber for instance of a motor vehicle. Furthermore, a serious drawback resides in that any addition of non-woven or meshed sheet is always accompanied with an increased pressure drop of the entire laminated composite, which may amount to as much as 30%.

This is an important aspect since today's motor vehicles have an accurately calculated energy distribution system. Only restricted quantities of energy are available to the range of heating/venting/conditioning. The costs of vehicle components are allowed to range only within a close compass. On the other hand the demands of motor vehicle buyers for equipment convenience and safety are getting higher and higher. From these aspects, particle filters of as low a pressure drop as possible are of special importance, low pressure implying a ventilated motor of small dimensions and, therefore, correspondingly low energy consumption. Furthermore, low differential pressure also means little noise of the fan for the throughput of certain quantities of air in the vehicle and consequently increased convenience of driving.

The demand for filter systems of low differential pressure competes with the requested filtration capacity and requested service life, i.e. the time in terms of mileage, for which a filter may remain in a vehicle before it must be replaced.

Pollen filters which only filter pollen from the air streaming into a vehicle are of little help to allergic persons. The allergens which the immune system of these persons reacts to are proteins, the diameter of which is only a fraction of the pollen diameter. They are in the range of 0.1 $\mu$m, i.e. in the most problematic range for particle filters, the so-called MPPS (most penetrating particle size). Consequently, solutions that are to be of some use to allergic persons must have a filtration capacity of at least 50%, this filtration capacity being measured by means of an aerosol, the particles of which have approximately the same density, for example NaCl. Incorporating filters of this type in motor vehicles is intended to attain a service life of 30,000 kilometers.

In theory it would be possible to produce non-woven staple fiber and melt-blown fabrics in such a way that they have sufficient rigidity of their own, thus being pleatable. However, it must be taken into consideration that for non-woven staple fiber fabrics stabilization takes place either thermally or by binders, it being necessary in the former case to accept a comparatively high differential pressure and in the latter case to accept very high emission rates. On the other hand, in order for meltblown fabrics to be rendered sufficiently stable to be used for instance in a motor vehicle interior filter box, a grammage or weight per unit area of more than 130 g/m$^2$ would have to be attained. The diameter of a meltblown fiber is in the range of approximately 2 $\mu$m. Given the grammage and fiber diameter, a non-acceptable differential pressure has to be expected.

SUMMARY OF THE INVENTION

It is the object of the invention to embody a filter arrangement of the type mentioned at the outset so that it will combine cost-efficient producibility and processibility with a low differential pressure and a long service life.

According to the invention, this object is attained by a single-layer, self-supporting micro-spunbonded fabric being used as a non-woven material, the grammage or weight per unit area of which ranges from 70 g/m$^2$ to 200 g/m$^2$, preferably from 110 to 150 g/m$^2$, the thickness from 0.7 to 1.5 mm and the fiber thickness from 2 to 20 $\mu$m with an average fiber thickness of 3 to 5 $\mu$m.

By advantage, it is provided that the non-woven has a higher fiber density on the flow-off side than on the flow-in side and that the non-woven is a pure-grade fabric made from PP (polypropylene) or PES (polyester) or PC (polycarbonate).

The invention also, but not exclusively, relates to the use of a filter arrangement of this type as a filter, in particular for motor vehicle interior air.

DETAILED DESCRIPTION OF PREFERRED EMBODIMENTS

Figure 1:
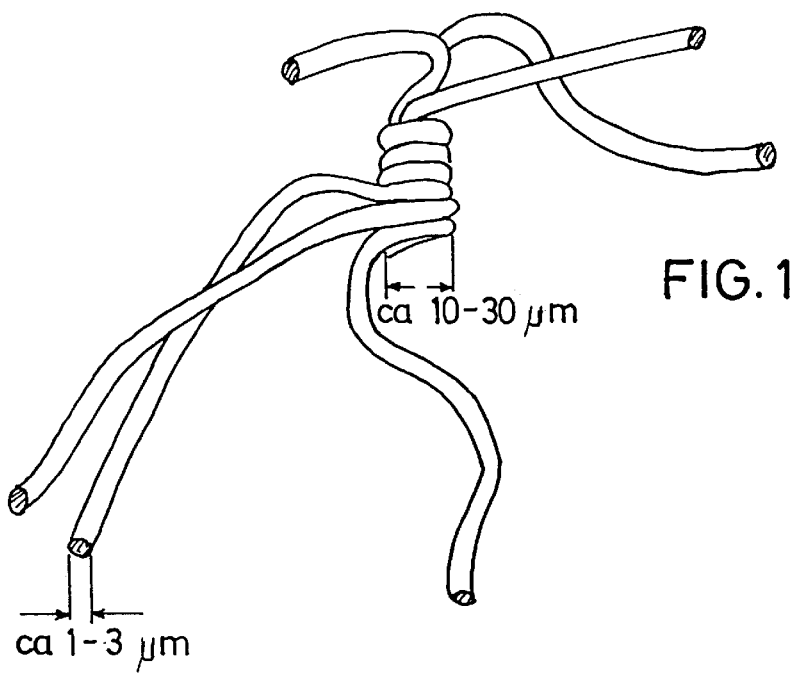
FIG. 1 is a diagrammatic illustration of the principle of formation of varying fiber thicknesses in the case of spunbonded fibers manufactured according to the micro-spunbonding method.

FIG. 1 illustrates the fiber arrangement as created during the spunbonding process and as utilized for the filter arrangement according to the invention. It is to be seen that on the one hand a "core" of thick fibers of a thickness of 10 to 33 µm is provided and that on the other hand individual salient fiber ends only have a thickness of 1 to 3 µm.

The manufacture of a micro-spunbonded fabric of the type under regard is described in detail in DE 41 23 122 A1. Surprisingly, it has been found that, while the requested parameters are observed, a manufacturing technique of this type will create a non-woven layer which, even without lining and without a supporting layer, will have a sufficient rigidity of its own for it to be pleated. A special advantage resides in that the inherent rigidity is virtually isotropic, i.e. the same flexural rigidity is attained in every direction of the non-woven. This may be due to the fact that on the one hand a non-woven layer of the type under regard has a fiber thickness of 3 to 5 µm, which conditions the excellent filter properties, but on the other hand also thicker fibers of up to 20 µm are available which form a type of a natural support structure without, as opposed to the lined support layers of the prior art, negatively affecting the filter properties, in particular in the sense of an increase of the differential pressure. Especially favorable properties can be attained by subsequent ultrasonic treatment and calendering. The lower fiber density and higher roughness on the flow-in side help attain that arriving particles are reliably retained, whereas the higher fiber density and lower roughness on the flow-off side ensure that no particles reach the range of the filtered air. In the manufacturing process which is typical for micro-spunbonded fabrics, this design can be put into practice in that the side of the non-woven on which the non-woven is deposited during manufacture is employed as a flow-off side when the fabric is inserted in the filter.

Details of the invention will become apparent from the ensuing description of a preferred embodiment as compared to background art filter material. Such a prior art filter material is commercially available for instance under the trademark Helsatech 8504.

|  | Background Art | Exemplary Embodiment |
| --- | --- | --- |
| Grammage in g/m²: | 100 | 130 |
| Thickness in mm: | 0.8 | 1.0 |
| Fiber thickness in µm: | approx. 3 | 2–20 (higher fiber thicknesses are obtained by fiber bunching) |
| Fiber orientation: | random | lengthwise of the sheet on the flow-off side, random on the flow-in side |
| Fiber structure: | three-layer laminate, varying fiber density of the individual layers | progressive: high fiber density on flow-off side, low fiber density on flow-in side |
| Fiber material: | PP/PES | PP |
| Flexural rigidity: (Schlenker process, DIN 53864) in cN/cm² | lengthwise 9.6 crosswise 12.2 | lengthwise = crosswise 26.7 |

The fibers are comparatively hot when deposited under pressure so that they bond together and a rigid pleatable mat originates.

| Comparison Measurements | Series Material Background Art | Micro-Spunbond acc. to Example |
| --- | --- | --- |
| Pressure drop at 3.8 m³/min (flow-in surface 0.06 m²) | 60 Pa | 40 Pa |
| Filtration capacity using NaCl with 0.3–0.5 µm of particle diameter | 50% | 50% |
| Pressure drop at a volume flow of 3.8 m³/min (flow-in surface 0.06 m²) after aging on an aging test distance, actuated by 50,000 m³ of road air on a much-used road | 300 Pa | 80 Pa |
| Fogging value (condensate value) | <5 mg/g | <0.5 mg/g |
| Combustion rate acc. to MVSS 302 (DIN 75200) | 30 mm/min | no combustion |
| Number of layers in the filtering medium | 3 | 1 |
| Material components | PP / PES | PP |
| Operating temperature | −40–100° C. | −40–100° C. |

As opposed to a prior art filter, a filter according to the invention excels additionally by an improved service life without the filtration capacity being affected.

Figure 2:
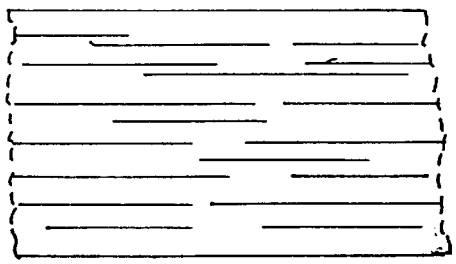
FIG. 2 is a diagrammatic illustration of the fiber arrangement in the non-woven on the flow-off side.
Figure 3:
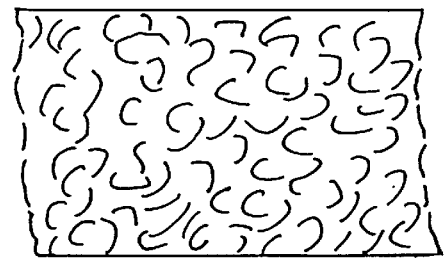
FIG. 3 is a diagrammatic illustration of the fiber arrangement in the non-woven on the flow-in side.

A comparison of FIGS. 2 and 3 shows that the fibers are aligned lengthwise on the flow-off side, correspondingly having a comparatively high fiber density, whereas FIG. 3 shows that the fibers are deposited randomly on the flow-in side, correspondingly having a low density.

Figure 4:
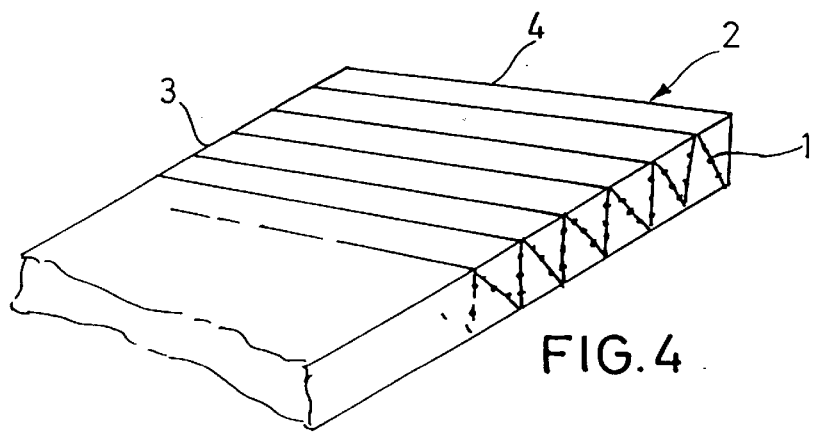
FIG. 4 is a diagrammatic perspective illustration of a filter arrangement comprising a pleated non-woven according to the invention in a frame.

FIG. 4 illustrates a filter arrangement with a pleated non-woven 1, the pleating, i.e the folding of the non-woven being roughly outlined by a lateral dashed line. The pleated non-woven 1 is fixed in a frame 2 which has lengthwise sides 3 and narrow sides 4 and consists of the same plastic material as the non-woven 1 to that only pure-grade plastic material has to be handled during waste disposal.

What is claimed is:

1. A filter arrangement comprising a pleated non-woven layer, wherein the non-woven layer is a single-layer, self-supporting micro-spunbonded fabric, the weight per unit area of which ranges from 70 g/m² to 200 g/m²; the thickness of which ranges from 0.7 to 1.5 mm and the fiber thickness of which ranges from 2 to 20 µm with an average fiber thickness of 3 to 5 µm, a plurality of said fibers comprising thick support fibers having a thickness up to about 20 µm.

2. A filter arrangement according to claim 1, wherein the micro-spunbonded fabric has a higher fiber density on the flow-off side than on the flow-in side.

3. A filter arrangement according to claim 1, wherein the micro-spunbonded fabric is a pure-grade fabric made from polypropylene, polyester or polycarbonate.

4. A filter arrangement according to claim 1, wherein said micro-spunbonded fabric is compressed by calendering.

5. A filter arrangement according to claim 1, having a structure such that with velocities of flow through the filter arrangement are less than 250 m³/min/m² , and the initial pressure loss is less than 50 Pa.

6. A filter arrangement according to claim 3, wherein the non-woven layer is polypropylene and is located in a flat filter box, the material of the frame or the adhesive consisting of the same material as the non-woven layer.

7. A filter arrangement according to claim 1, wherein the non-woven layer is pleated and located in a flat filter box with pleat heights ranging from 10 mm to 100 mm.

8. A filter arrangement according to claim 2, wherein the fibers of the non-woven layer are curled and random on the flow-in side and placed substantially in lengthwise alignment on the flow-off side.

9. A filter arrangement according to claim 2, wherein the micro-spunbonded fabric is a pure-grade fabric made from polypropylene, polyester or polycarbonate.

10. A filter arrangement according to claim 9, wherein the non-woven layer is polypropylene and is located in a flat filter box, the material of the frame, or the adhesive consisting of the same material as the non-woven layer.

11. A filter arrangement according to claim 1, wherein said micro-spunbonded fabric is a fabric which has been subjected to ultrasound.

12. A filter arrangement according to claim 11, wherein said micro-spunbonded fabric is a fabric which has been compressed by calendering.

13. A filter arrangement according to claim 1 wherein said weight per unit area is 110 g/m² to 150 g/m².

14. A filter arrangement comprising a pleated non-woven single layer of self-supporting micro-spunbonded fabric having an average fiber thickness of 3–5 mm, a weight per unit area of 70 g/m² to 200 g/m² and a thickness of 0.7 to 1.5 mm, said micro-spunbonded fabric comprising core fibers having a thickness of 10–33 μm and said supported micro-fibers.

15. A filter arrangement according to claim 14 wherein said micro-fibers have a thickness of 1–3 μm.

16. A filter arrangement according to claim 14 wherein said micro-spunbonded fabric has a higher fiber density on its downstream side than on its upstream side, and wherein said fabric is made entirely of polypropylene, polyester or polycarbonate.

* * * * *